United States Patent [19]

Erth

[11] 4,317,074
[45] Feb. 23, 1982

[54] INVERTER-MOTOR SYSTEM WITH DIFFERENT CONTROL CHARACTERISTICS FOR INVERTER VOLTAGE AND FREQUENCY

[75] Inventor: Richard A. Erth, York, Pa.

[73] Assignee: Borg-Warner Corporation, Chicago, Ill.

[21] Appl. No.: 75,291

[22] Filed: Sep. 12, 1979

[51] Int. Cl.³ ............................................. H02P 5/34
[52] U.S. Cl. .................................. 318/808; 318/729; 318/798
[58] Field of Search ............... 318/808, 807, 809, 729, 318/798, 810, 811; 363/37

[56] References Cited

U.S. PATENT DOCUMENTS

| | | | |
|---|---|---|---|
| 3,394,297 | 7/1968 | Risberg | 318/798 |
| 3,403,318 | 9/1968 | Krauthamer et al. | 363/37 |
| 3,584,279 | 6/1971 | Krauthamer | 318/808 |

Primary Examiner—David Smith, Jr.
Attorney, Agent, or Firm—James J. Jennings

[57] ABSTRACT

An inverter-motor combination is regulated in accordance with this invention to minimize deterioration of the power factor as the inverter is reduced from 100% load. This is accomplished by sensing the motor current and providing a control signal to regulate the inverter output frequency in accordance with a first function, representing virtually linear decrease in frequency as the load is reduced from 100% to substantially 70% of full load. A constant voltage stage is connected to regulate the d-c bus controller to provide a modified control signal for regulating the d-c bus level according to a second function, maintaining the d-c bus voltage at virtually 100% while the load is reduced to 70%. Thus the d-c bridge is not phased back and the power factor of the complete system is not degraded over this described operating range.

10 Claims, 3 Drawing Figures

INVERTER-MOTOR SYSTEM WITH DIFFERENT CONTROL CHARACTERISTICS FOR INVERTER VOLTAGE AND FREQUENCY

BACKGROUND OF THE INVENTION

Many different systems now use thyristors or other switching components connected in an inverter, to receive a d-c input voltage over a d-c bus and provide an output a-c voltage for energizing an electric induction motor. The motor in turn is mechanically connected to drive a load. A d-c bridge or other input component is generally connected to receive a-c voltage over an input line and, as a function of a control signal, to produce an adjustable level of d-c bus voltage for supplying the inverter. The inverter frequency is controlled through a logic system, in which a voltage controlled oscillator or a similar component has its frequency regulated to in turn regulate the frequency of inverter operation, thus controlling the frequency of the inverter voltage.

In such systems it is a general practice to control the inverter voltage amplitude and the inverter voltage frequency in a linear relationship, according to the same control characteristic. This is frequently termed a "constant V/f" operation, or constant volts/hertz operation. This is done to insure that at the higher power levels, there is sufficient current flow in the magnetic motor circuits to maintain the desired torque level. Certain workers in this technology have recognized the possibility of controlling the voltage amplitude and frequency of the inverter output in a manner other than a constant V/f mode. For example, U.S. Pat. No. 3,467,904, entitled "Speed Control System Utilizing Constant-Amplitude Voltage of Variable Frequency to Energize an Electric Motor", which issued Sept. 16, 1969 to the assignee of this invention, teaches the production of an inverter output voltage in which the frequency is varied to control the speed of a motor, while the voltage amplitude is maintained constant. Of course this simplifies the construction of the rectifier input bridge, which can be constructed with passive components to produce a constant d-c voltage on the bus to energize the inverter. However such a system does not afford the flexibility of producing a desired voltage control characteristic which varies in a manner different than the frequency characteristic of the inverter output voltage.

It is therefore a primary object of the present invention to produce an inverter-motor control system for regulating both the frequency and the amplitude of the inverter output voltage, but along different characteristic curves, to achieve a desired overall control function.

It is a more specific object of the invention to provide such an arrangement which, in conjunction with d-c input bridge, regulates the entire system operation in such a manner that the power factor of the system is not debilitated as the system is run down from the 100% load condition to a reduced operating level substantially below 100% load.

SUMMARY OF THE INVENTION

A control system constructed according to the present invention is useful with an inverter connected to drive an electric motor. The inverter provides an a-c output voltage over an output line to the motor when energized with a d-c voltage received over a d-c bus. A controllable d-c bridge is connected to supply the d-c voltage to the d-c bus.

The control system comprises circuit means connected to provide a control signal which varies as a function of the motor current amplitude. This signal is used to control the frequency of the inverter a-c output voltage.

Particularly in accordance with the present invention, a constant voltage circuit is coupled to the circuit means, and is connected to provide a modified control signal. It is this modified signal which regulates the operation of the d-c input bridge, thus regulating the amplitude of the d-c bus voltage. The voltage is regulated so that, as the entire system is lowered from a 100% load condition to a reduced operating level substantially below 100% load, the frequency of the inverter output voltage is gradually reduced but the amplitude of the inverter a-c output voltage remains substantially constant. In a preferred embodiment of the invention, the voltage amplitude was maintained constant down to a 70% load condition, from which point it was decreased in a linear fashion simultaneously with the decrease in the inverter operating frequency. In this way phaseback of the input bridge was avoided over this range from 100% to 70% of load, and as a result the debilitation of the power factor was precluded. This accomplishes a considerable energy saving with a consequent reduction in the electric utility bill.

THE DRAWING

In the several figures of the drawing, like reference numerals identify like components, and in that drawing.

DETAILED DESCRIPTION OF THE INVENTION

Figure 1:
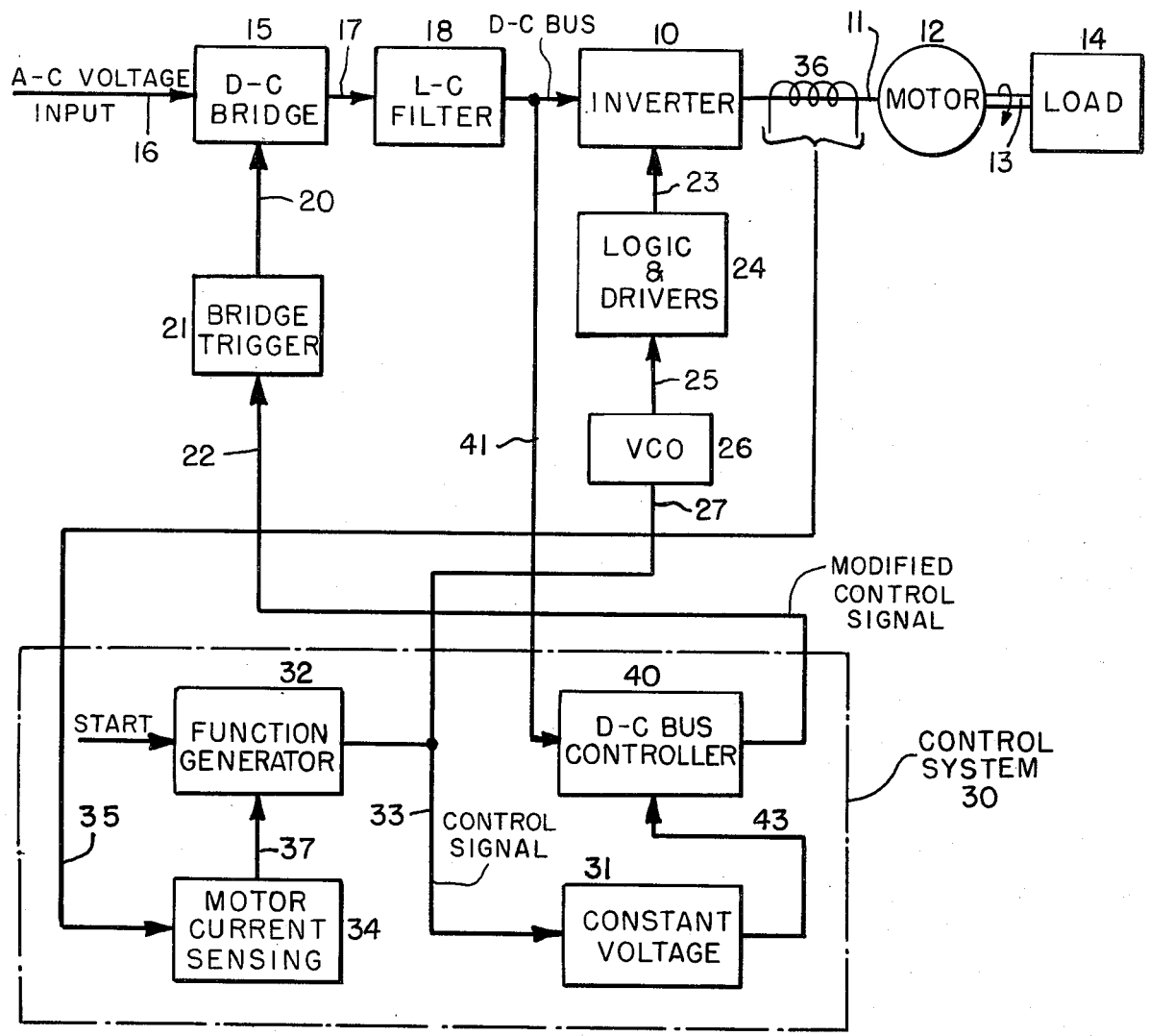
FIG. 1 is a block diagram of an input bridge-inverter-motor arrangement, with a control system connected according to the present invention.

As shown in FIG. 1, an inverter 10 is connected to provide a-c output energy over an output line 11 to drive a motor 12, which is coupled over a shaft 13 to drive any suitable mechanical load 14. The present invention was developed for use in connection with a large load, such as a turbocompressor in a refrigeration system. However those skilled in the art will appreciate the applicability of the underlying principles of this invention to all inverter-motor combinations in which an adjustable d-c input bridge 15 is provided to receive voltage over an a-c voltage input line 16 and provide an adjustable output d-c voltage on bus 17. An LC filter 18 is coupled between the output of the d-c bridge and the portion of the d-c bus which feeds inverter 10. Operation of the d-c bridge is regulated as a function of signals received over line 20 from a bridge trigger circuit 21, which in turn receives a control signal over line 22. The inverter output voltage frequency is determined by signals received by the inverter over line 23 from stage 24, including logic and driver stages for passing gating signals to the inverter switches in accordance with timing signals received over line 25 from a voltage controlled oscillator (VCO) 26. In turn VCO 26 is regulated by a control signal received over line 27.

In conventional systems where the voltage and frequency are regulated together in a constant V/f manner, as the firing angle of the thyristors in d-c bridge 15 is phased back, the power factor exhibited to the input line 16 is considerably worse. This results in the use of additional power and consequent increase in the utility bill, especially at lighter loads where the power factor is much worse.

In accordance with the present invention, control system 30 includes means, particularly a constant voltage circuit 31, for adjusting the d-c bridge operation in a manner different from the operation of the VCO stage to provide a different characteristic of the inverter output voltage as compared to the change in the inverter output frequency. In more detail, control system 30 includes a function generator stage 32, for producing a desired control signal and applying this signal to a reference conductor 33 for ultimately regulating both the frequency and the amplitude of the inverter output voltage. In this system the motor current sensing stage 34 receives a motor current sensing signal over line 35 from a current transformer 36, coupled to output line 11 between inverter 10 and motor 12. Stage 34 then provides a modifying signal over line 37 to function generator 32 to assist in the production of the control signal on line 33. The precise circuit details of stages 32 and 34 are not disclosed, in that they may be broadly considered as circuit means which are connected to provide a control signal which varies as a function of the level of the motor current, and used to control the frequency of the inverter a-c output voltage as a function of the control signal on line 33. This is accomplished by application of the control signal from line 33 over line 27 to VCO 26, regulating the logic and drive circuits to control the frequency of switching within inverter 10 and thus regulating the frequency of the a-c voltage provided from inverter 10.

A d-c bus controller 40 receives an input signal over line 41 from the d-c bus, denoting the level of the d-c voltage supplied to the inverter. The output signal from controller 40 is passed over line 22 to regulate the timing of the bridge trigger circuit 21, which in turn determines at what time in each cycle the thyristors or other switches in the d-c bridge 15 are turned on, thus regulating the amplitude of the d-c voltage supplied to the inverter. Conventionally, to provide constant V/f operation, the d-c bus controller could receive an input signal from line 33, so that its output or modified control signal would vary with the same characteristic as that of the frequency change, represented generally by curve 42 in FIG. 2.

However, in accordance with the present invention, constant voltage circuit 31 is interposed between conductor 33 and the d-c bus controller, providing a signal over line 43 to modify the operation of bus controller 40 and produce a modified control signal on line 22. In brief, constant voltage circuit 31 operates to provide a signal on line 43 with a characteristic depicted by curve 44 in FIG. 2. That is, the constant voltage stage 31 has a much higher gain over the initial portion of the system operating spectrum, so that at 70% of full load the voltage on d-c bus 17 is already past 100% of rated voltage, although the frequency is still considerably below the normal operating frequency of the inverter. This is important because after the system is operating at 100% load and is thereafter phased back from this operation, if the d-c bridge 15 is correspondingly phased back, a poor power factor is exhibited over the input line 16 to the utility company. More reactive power is required to supply a given demand, and this results in a corresponding unnecessary expense in utility bills. However by maintaining the amplitude of the d-c bus voltage at 100% as the system is reduced to an operating level substantially below 100% load, the phaseback of the d-c bridge is avoided and consequently a good power factor is achieved. For purposes of this explanation, reduction to an operating level substantially below 100% load means to at least 80% of rated load, although in the preferred embodiment it has been found preferable to reduce this operating point to 70% of full load before the d-c bus voltage is decreased.

Figures 2, 3:
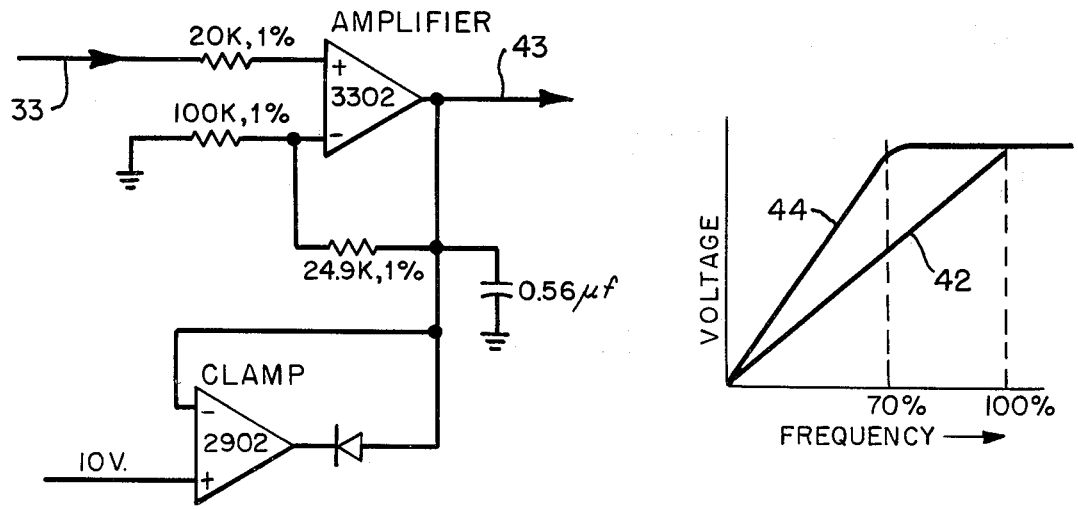
FIG. 2 is a graphical illustration useful in understanding operation of the invention.
FIG. 3 is a schematic diagram illustrating a preferred embodiment of the invention.

In a broad sense the constant voltage stage 31 is provided to increase the gain of the signal supplied over line 43 to the d-c bus controller, as contrasted to the level of the signal supplied over line 27 to the voltage controlled oscillator, providing the improved power factor regulation just described. To provide this higher gain, the 3302 amplifier shown in FIG. 3 is coupled over the 20K resistor to conductor 33. This amplifier provides the appropriate gain to produce the gain or slope of the curve 44 shown in FIG. 2. The 100K resistor is a component which can be simply removed, such as being clipped out by a wire cutter, to modify the operation of the 3302 to produce on line 43 a voltage which is exactly that on line 33. That is, the 3302 and its associated circuit is modified to have a gain of unity when the 100K resistor is removed, and this provides the constant V/f operation depicted by curve 42 in FIG. 2. The 2902 is connected as a clamp to insure that the output signal on line 43 does not exceed a certain level, such as 10 volts, which is also the maximum level of the signal on line 31. However with the 100K resistor in the circuit, the d-c bus voltage is maintained at its maximum level from 100% load down to 70% load, even though the frequency as determined by the signal on line 33 is reduced as shown by curve 42 in FIG. 2. This eliminates the poor power factor on the input to the inverter. Consequently there is a reduction in the actual power drawn from the utility, in that the induction motor can be run at a lower frequency with the resultant energy saving because of the system performance.

Technical Advantages

The present invention, unlike those inverter motor systems which are controlled at reduced amplitudes and frequencies during start-up, has been developed to maintain a maximum voltage on the d-c bus to the inverter from 100% load down to about 70% load, while the frequency is decreased in a straight-line manner over the same operating range. It is preferred to use a specially designed motor for such service. In the preferred embodiment a motor of the type described and claimed in U.S. Pat. No. 4,182,137 issued Jan. 8, 1980, entitled "Liquid Cooling System for Hermetically Sealed Electric Motor" and assigned to the assignee of this invention, was used. Other types of motors can of course be substituted for the one illustrated in the patent, but such an arrangement has been employed in the preferred embodiment and is recommended for such service.

In the appended claims the term "connected" means a d-c connection between two components with virtually zero d-c resistance between those components. The term "coupled" indicates there is a functional relationship between two components, with the possible interposition of other elements between the two components described as "coupled" or "intercoupled".

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A control system for an inverter connected to drive an electric motor, the inverter providing an a-c voltage over an output line to the motor upon receipt of a d-c voltage over a d-c bus, and a controllable d-c bridge connected to supply the d-c voltage to the d-c bus, which control system comprises:
   circuit means connected to provide a control signal varying as a function of the level of the motor current; and
   a constant voltage circuit, coupled to the circuit means, connected to provide a modified control signal for regulating the operation of the d-c bridge and thus regulating the amplitude of the d-c bus voltage, to regulate the amplitude of the inverter a-c output voltage in a manner such that as the inverter is reduced from 100% load to a reduced operating level substantially below 100% load, the frequency of the inverter a-c output voltage is gradually reduced but the amplitude of the inverter a-c output voltage remains substantially constant.

2. A control system as claimed in claim 1 in which said reduced operating level is 80% or less of 100% load.

3. A control system as claimed in claim 1 in which said reduced operating level is 70% of 100% load.

4. A control system as claimed in claim 1, and in which said circuit means comprises a motor current sensing stage, a current transformer coupled to said inverter output line for providing a signal varying as the motor current to the motor current sensing stage, and a function generator circuit coupled between the motor current sensing stage and the constant voltage circuit, to provide said control signal for regulating the inverter operating frequency.

5. A control system for a power transfer system in which an electric motor is connected to a load, an inverter is connected over an output line to the motor to energize the motor with an a-c voltage of variable amplitude and variable frequency, a d-c bridge is coupled between an a-c input line and a d-c bus supplying the inverter to provide an adjustable d-c voltage which determines the amplitude of the inverter a-c output voltage, a d-c bus controller connected to regulate operation of the d-c bridge and thus regulate the adjustable d-c voltage, frequency control means connected to sense the level of current supplied to the motor and to provide a control signal for regulating the frequency of the inverter output voltage in accordance with a first function, and a constant voltage circuit, connected between the frequency control means and the d-c bus controller, operative to modify operation of the d-c bus controller in the region below 100% inverter load so that the d-c bus controller produces a modified control signal for application to regulate the inverter output voltage amplitude in accordance with a second function differing from the first function by which the inverter output frequency is regulated until the inverter load reaches a predetermined reduced load level, and as the inverter load is further reduced below the reduced load level, both the amplitude and the frequency of the inverter a-c output voltage are gradually reduced.

6. A control system as claimed in claim 5, in which said first function is a virtually linear relationship between the inverter output voltage frequency and the inverter load as the load is reduced from 100% to said reduced load level substantially below 100%, and said second function exhibits virtually no change in the inverter output voltage amplitude between 100% load and said reduced load level.

7. A control system as claimed in claim 6, in which said reduced load level is substantially 70% of full load.

8. The method of controlling an inverter in the region below 100% load, which inverter is connected to energize an electric motor when supplied over a d-c bus from a d-c bridge, comprising the steps of:
   sensing the current level supplied to the motor to provide a control signal;
   utilizing the control signal to regulate the frequency of the inverter output voltage;
   sensing the level of the d-c voltage supplied in the inverter;
   operating upon the control signal regulating inverter frequency to produce an intermediate signal;
   combining the intermediate signal with the d-c voltage level signal to provide a modified control signal; and
   utilizing the modified control signal to regulate the amplitude of the d-c bus voltage supplied to the inverter, so that the voltage amplitude remains substantially constant from 100% load to a load level of approximately 70% of full load while the frequency of the inverter output voltage is decreased in a substantially linear manner over this same range.

9. A control system as claimed in claim 1, in which the constant voltage circuit includes a component which is easily removed and, upon such removal, operation of the constant voltage circuit is modified to produce a concomitant decrease of both the amplitude and the frequency of the inverter a-c output voltage as the inverter operating level is reduced below 100% load.

10. A control system as claimed in claim 5, in which the constant voltage circuit includes a component which is easily removed and, upon such removal, the constant voltage circuit produces an output signal virtually identical to its input signal, thus providing constant volts/cycle system operation as the inverter load decreases below 100% load.

* * * * *